United States Patent [19]

Nakano et al.

[11] Patent Number: 5,883,209
[45] Date of Patent: Mar. 16, 1999

[54] VINYL CHLORIDE POLYMERIZATION WITH CARBOXYLIC ACID ESTER OF POLYOL AND SUSPENSION AGENTS

[75] Inventors: Toshihiko Nakano; Tadashi Amano, both of Ibaraki-ken, Japan

[73] Assignee: Shin-Etsu Chemical Co., Ltd., Tokyo, Japan

[21] Appl. No.: 709,598

[22] Filed: Sep. 9, 1996

[30] Foreign Application Priority Data

Oct. 18, 1995  [JP]  Japan ..................................... 7-294787

[51] Int. Cl.$^6$ ....................................................... C08F 2/20
[52] U.S. Cl. .......................... 526/200; 526/202; 526/213; 526/215
[58] Field of Search ..................................... 526/200, 202, 526/204, 210, 212, 213, 215; 524/308, 310, 311

[56] References Cited

U.S. PATENT DOCUMENTS

| | | | |
|---|---|---|---|
| 4,169,819 | 10/1979 | Shiohara | 524/306 |
| 4,336,176 | 6/1982 | Lindner | 524/310 |
| 4,695,616 | 9/1987 | Caporossi | 526/202 |
| 4,797,458 | 1/1989 | Sharaby | 526/211 |
| 4,940,759 | 7/1990 | Yang | 526/62 |

*Primary Examiner*—Christopher Henderson
*Attorney, Agent, or Firm*—Oblon, Spivak, McClelland, Maier & Neustadt, P.C.

[57] ABSTRACT

The production process includes starting suspension polymerization of vinyl chloride-based monomer in a polymerization vessel in the presence of a particular combination of suspending agents; and, at the time when a polymerization conversion has reached 5 to 60%, further adding to the reaction mixture a partially saponified polyvinyl alcohol having an average polymerization degree of 1,500 to 4,000 and a saponification degree of 75 to 98 mole %, wherein a carboxylic acid ester of polyhydric alcohol is further added to at least one one selected from a content inside the polymerization vessel prior to the start of the polymerization, a content inside the polymerization vessel during the polymerization, and the resulting polymer. According to the process, there is obtained a vinyl chloride polymer having a large bulk specific gravity and a fast gelation rate, and from the polymer, a formed part small in both the number of fish eyes and the amount of residual monomer can be obtained.

15 Claims, No Drawings

VINYL CHLORIDE POLYMERIZATION WITH CARBOXYLIC ACID ESTER OF POLYOL AND SUSPENSION AGENTS

BACKGROUND OF THE INVENTION

1. Field of the Invention

The present invention relates to a process for producing a vinyl chloride polymer having a large bulk specific gravity.

2. Description of the Prior Art

Vinyl chloride polymers are resins excellent in physical properties and are broadly employed as a rigid polyvinyl chloride or a flexible polyvinyl chloride. In recent years, there are demanded a vinyl chloride polymer having a large bulk specific gravity capable of increasing an extrusion rate in extruders in order to improve the productivity of polyvinyl chloride products when extrusion molding rigid polyvinyl chlorides. Conventionally known suspension polymerization methods for the purpose of obtaining a vinyl chloride polymer having a large bulk specific gravity include, for example, a method charging an additional monomer during polymerization [see Japanese Pre-examination Patent Publication (Kokai) No. 59-168008], a method using a highly saponified polyvinyl alcohol as a suspending agent [see Japanese Pre-examination Patent Publication (Kokai) Nos. 57-7600 and 4-323204, and Japanese Patent Publication (Kokoku) No. 1-27088] and a method charging an additional suspending agent during polymerization [see Japanese Pre-examination Patent Publication (Kokai) Nos. 3-70703 and 5-39309]. These methods can increase the bulk specific gravity of the resulting polymer to some extent, while to the contrary, they have the problems that the gelation rate of the polymer is slow and fish eyes increase in formed parts obtained from the polymer. Further, especially when a so-called nontoxic stabilizer such as Ca-Zn stabilizer is added to a compound, in which various additives have been compounded in the resulting polymer, for use in producing formed parts, there are problems in that the bulk specific gravity of the compound is not so large and also the extrusion rate of the compound in extruders does not increase. Furthermore, since such a nontoxic stabilizer is weak in stabilizing action for polymers, there are also problems in that products (formed parts) from the resulting polymer are unsatisfactory in thermal stability, initial coloration, etc.

SUMMARY OF THE INVENTION

An object of the present invention is to provide a process for producing a vinyl chloride polymer having a large bulk specific gravity and being fast in gelation rate, said process being capable of producing formed parts small in both the number of fish eyes and the amount of residual monomer and being capable of producing formed parts excellent in thermal stability and initial coloration especially even when a Ca-Zn stabilizer or the like was used.

According to the present invention, there is provided a process for producing a vinyl chloride polymer wherein vinyl chloride monomer or a monomeric mixture containing vinyl chloride monomer is subjected to suspension polymerization in an aqueous medium charged in a polymerization vessel in the presence of a monomer-soluble polymerization initiator and a suspending agent, comprising the steps of starting the polymerization of said monomer or monomeric mixture in the presence of a first suspending agent consisting of:

(A) a partially saponified polyvinyl alcohol having an average polymerization degree of 1,500 to 2,700 and a saponification degree of 75 to 85 mole %;

(B) a hydroxypropyl methyl cellulose having a methoxy-substitution degree of 26 to 30% by weight and a hydroxypropoxy-substitution degree of 4 to 15% by weight and having a viscosity at 20° C. of 5 to 4,000 cP in the form of a 2 weight % aqueous solution thereof; and (C) a partially saponified polyvinyl alcohol having an average polymerization degree of 1,500 to 4,000 and a saponification degree of 90 to 98 mole %, and, at the time when a polymerization conversion has reached 5 to 60%, further adding to the polymerization system (D) a partially saponified polyvinyl alcohol having an average polymerization degree of 1,500 to 4,000 and a saponification degree of 75 to 98 mole % as a second suspending agent to effect the polymerization, said process comprising still further adding a carboxylic acid ester of polyhydric alcohol to at least one material selected from the contents inside the polymerization vessel prior to the start of the polymerization, the contents inside the polymerization vessel during the polymerization, and the resulting polymer.

According to the production method of the present invention, since the resulting vinyl chloride polymer has a large bulk specific gravity, an extrusion rate in extruders can be increased and the productivity of polyvinyl chloride products can be improved, even when a rigid polyvinyl chloride is subjected to extrusion molding. Further, the resulting polymer is fast in gelation, from which there can be obtained molded products having extremely small in both the number of fish eyes and the amount of residual monomer. Furthermore, even when a nontoxic stabilizer such as Ca-Zn stabilizer was used, there can be obtained compounds sufficiently large in bulk specific gravity and polyvinyl chloride products excellent in thermal stability and initial coloration. Consequently, the production process of the present invention is particularly suitable for producing vinyl chloride polymers to be used when a rigid polyvinyl chloride using a nontoxic stabilizer such as Ca-Zn stabilizer is subjected to extrusion molding.

DETAILED DESCRIPTION OF THE PREFERRED EMBODIMENTS

The present invention will be hereinafter described in detail.

(1):

In the production process of the present invention, the polymerization of monomer is first started in the presence of a first suspending agent. The first suspending agent consists of the following components (A), (B) and (C).

First suspending agent

Component (A) is a partially saponified polyvinyl alcohol having an average polymerization degree of 1,500 to 2,700 and a saponification degree of 75 to 85 mole %. If the average polymerization degree or the saponification degree is too small, the suspension system becomes unstable, whereby the resulting polymer becomes coarse particles and polymer scale sticks to the inside of the polymerization vessel. To the contrary, if the average polymerization degree or the saponification degree is too large, the number of fish eyes, which are generated in formed parts obtained by forming the resulting polymer, increases.

Component (B) is a hydroxypropyl methyl cellulose having a methoxy-substitution degree of 26 to 30% by weight and a hydroxypropoxy-substitution degree of 4 to 15% by weight and having a viscosity at 20° C. of 5 to 4,000 cP in the form of a 2 weight % aqueous solution thereof. If the methoxy-substitution degree or the hydroxypropoxy-substitution degree is too small, the number of fish eyes generated in formed parts increases. To the contrary, if the methoxy-substitution degree or the hydroxypropoxy-substitution degree is too large, there occurs the disadvantage that the particle size distribution of the resulting polymer becomes broad. Further, if said viscosity is too high, there occurs the disadvantage that the number of fish eyes increases in formed parts.

The amount of components (A) and (B) used is preferably 0.03 to 0.1 part by weight, and more preferably 0.03 to 0.06 part by weight, in terms of the total amount of components (A) and component (B), per 100 parts by weight of the monomer or monomeric mixture. The weight ratio of component (A)/component (B) is preferably 6/4 to 9/1, and more preferably 7/3 to 9/1. If the ratio of component (A)/component (B) is too large, fish eyes in formed parts and the amount of residual monomer may increase and also the resulting polymer may become coarse particles to thereby increase on-sieve (or plus sieve) particles.

To the contrary, if the ratio is too small, the bulk specific gravity of the polymer may become small.

Component (C) is a partially saponified polyvinyl alcohol having an average polymerization degree of 1,500 to 4,000 and a saponification degree of 90 to 98 mole %. If the average polymerization degree or the saponification degree is too small or too large, the bulk specific gravity of the polymer lowers or on-sieve particles increase to cause an increase of fish eyes in formed parts.

The amount of component (C) used is preferably 0.002 to 0.1 part by weight, and more preferably 0.005 to 0.08 part by weight, per 100 parts by weight of the monomer or monomeric mixture. If the amount used is too small, the bulk specific gravity may become small. In contrast thereto, if the amount is too large, the number of fish eyes in formed parts and the amount of residual monomer may become large.

(2):

In the production process of the present invention, at the time when a polymerization conversion has reached 5 to 60%, and preferably 30 to 60%, after starting the polymerization of the monomer or monomeric mixture in the presence of the first suspending agent, the polymerization of the monomer or monomeric mixture is continued by further adding a second suspending agent to the polymerization system. Incidentally, if the second suspending agent is added to the polymerization system before the polymerization conversion has reached 5%, it is unpreferable since the particle size of the resulting polymer becomes fine. If the second dispersion agent is added to the polymerization system after the polymerization conversion was more than 60%, the bulk specific gravity of the polymer becomes small incidentally, the polymerization conversion can be calculated by measuring the time passed after starting the polymerization.

Second suspending agent

The second suspending agent used in the present invention is a partially saponified polyvinyl alcohol having an average polymerization degree of 1,500 to 4,000 and a saponification degree of 75 to 98 mole %. If the average polymerization degree or the saponification degree is too small or too large, an effect increasing the bulk specific gravity can not be obtained.

The amount of the second suspending agent used is preferably 0.002 to 0.1 part by weight, and more preferably 0.005 to 0.1 part by weight, per 100 parts by weight of the monomer or monomeric mixture. If the amount used is too small, the bulk specific gravity may not be increased. In contrast thereto, if the amount is too large, polymer scale may stick to the inner wall, and the like, of the polymerization vessel or fish eyes in formed parts obtained from the resulting polymer may increase, due to foaming of a content inside the polymerization vessel. Incidentally, as the second suspending agent, at least one selected from said component (A) and component (C) can also be used.

(3):

As mentioned above, the present invention is a production process for effecting polymerization of the monomer using the first suspending agent and the second suspending agent. In the process, a carboxylic acid ester of polyhydric alcohol is further added to at least one material selected from the contents inside the polymerization vessel prior to the start of the polymerization, the contents inside the polymerization vessel during the polymerization, and the resulting polymer. The esters used in the present invention are those in which at least part of hydroxyl groups contained in polyhydric alcohol has been esterified with a carboxylic acid.

Said polyhydric alcohol includes, for example, ethylene glycol, 1,2-propylene glycol, 1,4-butylene glycol, neopentyl glycol, ricinoleyl alcohol, erythritol, mannitol, sorbitol, trimethylolethane, trimethylolpropane, glycerin, 2-hydroxymethyl-3-methylbutane-1,3-diol, 3-methylpentane-1,3,5-triol, tris(2-hydroxyethyl) isocyanurate, hexane-1,2,6-triol, 2-hydroxymethyl-2-methylbutane-1,3-diol, 2,4-dimethyl-3-hydroxymethylpentane-2,4-diol, pentaerythritol, diglycerin, ditrimethylolethane, ditrimethylolpropane, 2,2,6,6-tetramethylolcyclohexanol, dipentaerythritol and inositol. Said carboxylic acid includes, for example, caproic acid, pelargonic acid, lauric acid, 2-ethylhexanoic acid, myristic acid, palmitic acid, undecylenic acid, ricinoleic acid, linoleic acid, neodecanoic acid, isostearic acid, 12-hydroxystearic acid, 12-ketostearic acid, chlorostearic acid, phenylstearic acid, arachic acid, behenic acid, erucic acid, brassidic acid, tallow fatty acid, coconut oil fatty acid, tung oil fatty acid, soybean oil fatty acid, cotton seed oil fatty acid, benzoic acid, toluic acid, salicylic acid, p-tert-butylbenzoic acid, 5-tert-octylsalicylic acid, naphthenic acid, xylylic acid, ethylbenzoic acid, isopropylbenzoic acid, di-tert-butylbenzoic acid, bromobenzoic acid and adipic acid. Particularly typical carboxylic acid esters of polyhydric alcohol include, for example, pentaerythritol monostearate, dipentaerythritol distearate, pentaerythritol monomyristate, dipentaerythritol diadipate and pentaerythritol monoadipate. The above carboxylic acid esters of polyhydric alcohol can be used singly or in a combination of two or more thereof.

The material to which said ester is added, is at least one selected from the contents inside the polymerization vessel prior to the start of the polymerization, the contents inside the polymerization vessel during the polymerization, and the resulting polymer. The wording "to add the ester to the contents inside the polymerization vessel prior to the start of the polymerization" means "to add the ester such that the polymerization of the monomer can be started at least in the presence of the ester" and includes the case where the ester is first charged into the polymerization vessel. That is, the ester is added such that the ester is contained in the polymer at least immediately before the polymer is molded. Accordingly, the ester may be charged into the polymerization vessel together with an aqueous medium and the first suspending agent, etc. prior to the start of the polymerization; the ester may be charged into the polymerization vessel together with the second suspending agent during the polymerization; or the ester may be added to a slurry containing the polymer obtained after the polymerization was over, a cake obtained after the slurry was dehydrated, the polymer after dried, the polymer immediately before being formed, or the like.

Among the materials to which the carboxylic acid ester of polyhydric alcohol is added, preferred is the contents inside the polymerization vessel prior to the start of the polymerization, the contents inside the polymerization vessel during the polymerization, a slurry obtained after the completion of the polymerization, or a cake obtained after the dehydration of the slurry. The addition of said ester to said preferable material as mentioned above results in obtaining vinyl chloride polymers improved not only in thermal stability and initial coloration but also in fish eyes, residual monomer and gellation rate.

By adding a carboxylic acid ester of polyhydric alcohol as mentioned above, a vinyl chloride polymer having a large bulk specific gravity can be obtained. In case the ester is added to the contents inside the polymerization vessel prior to the start of the polymerization or the slurry, the ester can be used in the form of powder. However, it is generally preferred that the ester is used in the form of a solution or dispersion of the ester dissolved or dispersed in water or a solvent. The amount of the carboxylic acid ester of polyhydric alcohol used is preferably 0.005 to 0.5 part by weight, and more preferably 0.005 to 0.08 part by weight, per 100 parts by weight of the resulting polymer. If the amount is too small, the gelation rate, initial coloration and thermal stability of the resulting polymer when a Ca-Zn nontoxic stabilizer was used as a stabilizer may be lowered. Even if the amount is too large, it is not economical since an increase in effect corresponding to the amount increased can not be confirmed.

(4):

The production process of the present invention can be practiced under the same conditions as in the production process of a vinyl chloride polymer conventionally carried out, except that the polymerization is carried out using the first suspending agent, the second suspending agent and the carboxylic acid ester of polyhydric alcohol, as mentioned above. That is, charging of monomers, an monomer-soluble polymerization initiator, an aqueous medium and the like into a polymerization vessel may be carried out in the same manner as conventional. Also, the polymerization temperature may be in the range of 35° to 70° C. as conventional.

Monomer

The monomer used in the production process of the present invention includes vinyl chloride monomer, and in addition thereto, it may be a monomeric mixture (the amount of vinyl chloride monomer being 50% by weight or more) of vinyl chloride monomer, as a base component, and a vinyl monomer (comonomer) copolymerizable therewith, as mentioned above. Said comonomer includes, for example, vinyl esters such as vinyl acetate and vinyl propionate; acrylic and methacrylic esters such as methyl acrylate, ethyl acrylate, methyl methacrylate and ethyl methacrylate; olefins such as ethylene and propylene; vinyl ethers such as lauryl vinyl ether and isobutyl vinyl ether; maleic anhydride; acrylonitrile; styrene; vinylidene chloride and other monomers copolymerizable with vinyl chloride. They are used singly or in a combination of two or more thereof.

Monomer-soluble polymerization initiator

The monomer-soluble polymerization initiator used in the present invention includes, for example, percarbonate compounds such as diisopropyl peroxydicarbonate, di-2-ethylhexyl peroxydicarbonate and diethoxyethyl peroxydicarbonate; perester compounds such as t-butyl peroxyneodecanoate, α-cumyl peroxyneodecanoate, tert-butyl peroxyneodecanoate, 3-hydroxy-1,1-dimethylbutyl peroxyneodecanoate, (α,α'-bisneodecanoylperoxy) diisopropylbenzene, 1-cyclohexyl-1-methylethyl peroxyneodecanoate, 2,4,4-trimethylpentyl 2-peroxyneodecanoate and 2,4,4-trimethylpentyl 2-peroxyphenoxyacetate; organic peroxides such as acetylcyclohexylsulfonyl peroxide; and azo compounds such as azobis-2,4-dimethylvaleronitrile and azobis(4-methoxy-2,4-dimethylvaleronitrile). They can be used singly or in combination of two or more thereof.

The amount of the monomer-soluble polymerization initiator used is preferably 0.03 to 5.0 parts by weight, and more preferably 0.04 to 1.5 parts by weight, per 100 parts by weight of said monomer or monomeric mixture.

Aqueous medium

Said aqueous medium includes, for example, deionized water. The amount of the aqueous medium used may be about 80 to 150 parts by weight per 100 parts by weight of said monomer or monomeric mixture, and an additional aqueous medium may be charged during the polymerization.

Other additives

In the production process of the present invention, there can be added, if necessary, additives such as polymerization-degree regulators, chain transfer agents, pH adjusters, gelation improvers, antistatic agents, crosslinking agents, fillers, antioxidants, buffers and scale preventive agents, which additives are suitably used in the production of vinyl chloride polymers. Further, a small amount of surfactants can be also added.

EXAMPLES

The present invention will be described in detail with reference to working examples.

Example 1 to 3 and Comparative Example 1 to 5

Into a polymerization vessel made of stainless steel having an inner capacity of 2,000 liters equipped with an agitator and a water jacket, 900 kg of deionized water and suspending agents (each referred to as "suspending agent added prior to start of polymerization") of which kinds and amounts are shown in Tables 1 to 3 (Table 1 demonstrates Examples 1 to 3, Table 2 Comparative Examples 1 to 3, and Table 3 Comparative Examples 4 and 5; the same being applied hereinafter.) were charged. Then, after the polymerization vessel was evacuated until the inner pressure thereof reached 50 mmHg, 700 kg of vinyl chloride monomer was charged therein. While stirring the content inside the polymerization vessel by the agitator, 350 g of t-butyl neodecanoate and 105 g of α-cumyl neodecanoate were pressure-charged into the polymerization vessel and simultaneously the temperature of the content inside the polymerization vessel was raised to 57° C. by passing a heated water through the water jacket. Thereafter, polymerization was carried out with stirring while maintaining the temperature of the content at 57° C. Then, at the time when the polymerization conversion reached values shown in Tables 1 to 3, suspending agents (each referred to as "suspending agent added during polymerization") of which kinds and amounts are shown in Tables 1 to 3 were pressure-charged into the polymerization vessel and the polymerization reaction was continued.

Thereafter, at the time when the inner pressure of the polymerization vessel was dropped to 6.0 kg/cm$^2$ (gauge pressure), the polymerization reaction was stopped. After unreacted monomer was recovered, the resulting vinyl chloride polymer was taken out of the polymerization vessel in the form of a slurry. The taken vinyl chloride polymer was passed through a monomer-removal column in which the polymer was contacted with steam in counter current and was then heat-treated for 2 minutes under such a condition that the temperature of the polymer at the medium position of the monomer-removal column was 90° C.

Then, after carboxylic acid esters of polyhydric alcohol of which kinds and amounts were listed in Tables 1 to 3 were added to the heat-treated vinyl chloride polymer slurry, the slurry was dehydrated by means of a centrifugal machine. Thereafter, the resulting dehydrated cake was dried in a batch type flow drier at 70° C. for thus obtained. The thus obtained polymer was measured for bulk specific gravity, particle size distribution, fish eyes, residual monomer, initial coloration, thermal stability and gelation rate as mentioned below. The results are shown in Tables 1 to 3 in which all parts are parts by weight and all A/B ratios are A/B weight ratios.

Bulk specific gravity
Measured in accordance with JIS K 6721.
Particle size distribution
In accordance with JIS Z 8801, the polymer particles were sifted using each of sieves #60, #80, #100, #150 and #200, and the amount of the particles [i.e. on-sieve (or plus sieve) particles] remained on each sieve and the amount of the particles passed [i.e. pass-sieve (or minus sieve) particles] through each sieves were weighed. The amount passed through is represented by % by weight.
Fish eyes
A compound was prepared by mixing 100 g of the resulting polymer, 0.5 g of tribasic lead sulfate, 2.5 g of lead stearate, 0.7 g of barium stearate, 0.1 g of titanium oxide and 0.035 g of carbon black. After the compound was blended using a 6 inch roll at 160° C. for 7 minutes, the resulting blend was formed into a sheet having a width of 15 cm and a thickness of 0.5 mm. The number of transparent particles revealed on the whole surface of the thus obtained sheet was counted.

Residual monomer
A predetermined amount of the resulting polymer was dissolved in tetrahydrofuran, and the content of monomer contained in the resulting polymer solution was determined as residual monomer by gas chromatography. The amount of the residual monomer is represented by ppm per the polymer (weight) after dried.
Initial coloration
To 100 g of the resulting polymer, 3 g of a one pack type Ca-Zn stabilizer was added, and they were blended using a 6 inch roll at 180° C. for 5 minutes, followed by forming the resulting blend into a sheet having a thickness of 0.8 mm. 8 individuals of the sheets were overlapped and pressed at 180° C. for 5 minutes to thereby prepare a formed part of 35 mm (length)×35 mm (width)×5 mm (thickness). The degree of coloration of the thus obtained formed part was evaluated as initial coloration in accordance with the following criteria.
Criteria for evaluation
A: Good
B: Rather inferior (pale yellowish)
C: Poor (thick yellowish and darkish)
Thermal stability
The sheet having a thickness of 0.8 mm used in said evaluation test for initial coloration was placed in a oven maintained at 190° C., and the time (minutes) until the color of the sheet turned black completely was measured.
Gelation rate
67 g of a compound prepared by mixing 100 parts by weight of the resulting polymer with 3 parts by weight of a Ca-Zn one pack stabilizer was charged into a PLASTI-CORDER (type 50 kneader manufactured by Brabender, jacket temperature: 200° C., rotor: 50 rpm) and was stirred. The time (minutes) ranging from when the compound was charged to when the stirring torque of the PLASTI-CORDER reached maximum was measured.

TABLE 1

|  | Example 1 | Example 2 | Example 3 |
| --- | --- | --- | --- |
| Suspending agent added prior to start of polymerization (per 100 parts of monomer) | Suspending agent A + suspending agent B (A/B ratio = 7/3) 0.05 part Suspending agent C 0.02 part | Suspending agent A + suspending agent B (A/B ratio = 9/1) 0.065 part Suspending agent C 0.01 part | Suspending agent A + suspending agent B (A/B ratio = 6/4) 0.04 part Suspending agent C 0.02 part |
| Suspending agent added during polymerization (per 100 parts of monomer) | Suspending agent A 0.04 part Time added: When polymerization conversion reached 40% | Suspending agent D 0.02 part Time added: When polymerization conversion reached 40% | Suspending agent D 0.03 part Time added: When polymerization conversion reached 50% |
| Carboxylic acid ester of polyhydric alcohol (per 100 parts of polymer) | Pentaerythritol monostearate 0.05 part | Dipentaerythritol distearate 0.05 part | Pentaerythritol monomyristate 0.05 part |
| Bulk specific gravity (g/cc) | 0.595 | 0.598 | 0.596 |
| Particle size distribution (pass %) | | | |
| #60 | 100 | 100 | 100 |
| #80 | 61.3 | 59.3 | 70.4 |
| #100 | 27.1 | 28.0 | 33.8 |
| #150 | 4.2 | 5.5 | 5.4 |
| #200 | 0.0 | 0.6 | 0.3 |

TABLE 1-continued

|  | Example 1 | Example 2 | Example 3 |
|---|---|---|---|
| Fish eyes (number) | 0 | 0 | 0 |
| Residual monomer (ppm) | 0.5 | 0.7 | 0.6 |
| Initial coloration | A | A | A |
| Thermal stability (minute) | 60 | 60 | 0 |
| Gelation rate (minute) | 5.5 | 5.7 | 5.6 |

In Table 1, suspending agent A is a partially saponified polyvinyl alcohol having a saponification degree of 80.2 mole % and an average polymerization degree of 2,600. Suspending agent B is a hydroxypropyl methyl cellulose having a methoxy-substitution degree of 29.2% by weight and a hydroxypropoxy-substitution degree of 8.9% by weight and having a viscosity at 20° C. of 49.5 cP in the form of a 2 weight % aqueous solution thereof. Suspending agent C is a partially saponified polyvinyl alcohol having a saponification degree of 97.0 mole % and an average polymerization degree of 2,100. Suspending agent D is a partially saponified polyvinyl alcohol having a saponification degree of 95.0 mole % and an average polymerization degree of 3,300.

TABLE 2

|  | Comp. Example 1 | Comp. Example 2 | Comp. Example 3 |
|---|---|---|---|
| Suspending agent added prior to start of polymerization (per 100 parts of monomer) | Suspending agent A + suspending agent B (A/B ratio = 7/3) 0.06 part | Suspending agent A + suspending agent B (A/B ratio = 7/3) 0.05 part Suspending agent C 0.02 part | Suspending agent E + suspending agent B (E/B ratio = 7/3) 0.07 part Suspending agent C 0.02 part |
| Suspending agent added during polymerization (per 100 parts of monomer) | Suspending agent A 0.04 part Time added: When polymerization conversion reached 40% | Suspending agent A 0.04 part Time added: When polymerization conversion reached 40% | Suspending agent A 0.04 part Time added: When polymerization conversion reached 40% |
| Carboxylic acid ester of polyhydric alcohol (per 100 parts of polymer) | None | None | None |
| Bulk specific gravity (g/cc) | 0.575 | 0.590 | 0.595 |
| Particle size distribution (pass %) |  |  |  |
| #60 | 100 | 100 | 99.5 |
| #80 | 72.4 | 62.2 | 68.4 |
| #100 | 34.9 | 28.3 | 29.4 |
| #150 | 6.0 | 4.5 | 3.9 |
| #200 | 0.5 | 0.0 | 0.1 |
| Fish eyes (number) | 0 | 2 | 15 |
| Residual monomer (ppm) | 0.8 | 0.5 | 5.6 |
| Initial coloration | B | B | B |
| Thermal stability (minute) | 45 | 45 | 45 |
| Gelation rate (minute) | 7.0 | 7.5 | 8.2 |

In Table 2, suspending agent A, suspending agent B and suspending agent C are the same as those in Table 1. Suspending agent E is a partially saponified polyvinyl alcohol having a saponification degree of 88.0 mole % and an average polymerization degree of 2,500.

TABLE 3

|  | Comp. Example 4 | Comp. Example 5 |
|---|---|---|
| Suspending agent added prior to start of polymerization (per 100 parts of monomer) | Suspending agent A + suspending agent B (A/B ratio = 24/1) 0.07 part Suspending agent C 0.03 part | Suspending agent A + suspending agent B (A/B ratio = 7/3) 0.05 part Suspending agent E 0.02 part |
| Suspending agent added during polymerization (per 100 parts of monomer) | None | Suspending agent A 0.03 part Time added: When polymerization conversion reached 40% |
| Carboxylic acid ester of polyhydric alcohol (per 100 parts of polymer) | None | None |
| Bulk specific gravity (g/cc) | 0.592 | 0.590 |
| particle size distribution (pass %) |  |  |
| #60 | 98.9 | 99.8 |
| #60 | 68.2 | 70.5 |
| #100 | 25.4 | 35.4 |
| #150 | 4.3 | 5.2 |
| #200 | 0.5 | 0.3 |
| Fish eyes (number) | 20 | 16 |
| Residual monomer (ppm) | 8.2 | 6.1 |
| Initial coloration | B | B |
| Thermal stability (minute) | 45 | 45 |
| Gelation rate (minute) | 9.6 | 8.9 |

In Table 3, suspending agent A, suspending agent B, suspending agent C and suspending agent C are the same as those in Table 2.

Example 4

Polymerization was carried out in the same manner as in Example 1, except that 0.05 part by weight (per 100 parts by weight of the polymer) was not added to the heat-treated vinyl chloride polymer and instead thereof, 0.05 part by weight (per 100 parts by weight of the polymer) of pentaerythritol monostearate was charged in the polymerization vessel together with the suspending agent added prior to the start of the polymerization. After the polymerization was over, the resulting vinyl chloride polymer was taken out of the polymerization vessel in the form of a slurry and was heat-treated in a monomer-removal column according to the same manner as in Example 1. The thus obtained polymer was measured for bulk specific gravity, particle size distribution, fish eyes, residual monomer, initial coloration, thermal stability and gelation rate in the same manner as in Example 1. The results are shown in Table 4.

TABLE 4

|  | Example 4 |
|---|---|
| Suspending agent added prior to start of polymerization (per 100 parts of monomer) | Suspending agent A + suspending agent B (A/B ratio = 7/3) 0.05 part Suspending agent C 0.02 part |
| Suspending agent added during polymerization (per 100 parts of monomer) | Suspending agent A 0.04 part Time added: When polymerization conversion reached 40% |
| Carboxylic acid ester of polyhydric alcohol (per 100 parts of polymer) | Pentaerythritol monostearate 0.05 part |
| Bulk specific gravity (g/cc) | 0.595 |
| Particle size distribution (pass %) |  |
| #60 | 100 |
| #80 | 59.1 |
| #100 | 26.3 |
| #150 | 3.9 |
| #200 | 0.0 |
| Fish eyes (number) | 0 |
| Residual monomer (ppm) | 0.4 |
| Initial coloration | A |
| Thermal stability (minute) | 60 |
| Gelation rate (minute) | 5.6 |

In Table 4, suspending agent A, suspending agent B and suspending agent C are the same as those in Table 1.

What is claimed is:

1. A process for producing a vinyl chloride polymer wherein vinyl chloride monomer or a monomeric mixture containing vinyl chloride monomer is subjected to suspension polymerization in a aqueous medium in a polymerization vessel in the presence of a monomer-soluble polymerization initiator and a suspending agent, which process comprises the steps of:

starting the polymerization of said monomer or monomeric mixture in the presence of a first suspending agent consisting of:
   (A) a partially saponified polyvinyl alcohol having an average polymerization degree of 1,500 to 2,700 and a saponification degree of 75 to 85 mole %;
   (B) a hydroxypropyl methyl cellulose having a methoxy-substitution degree of 26 to 30% by weight and a hydroxyproxy-substitution degree of 4 to 15% by weight and having a viscosity at 20° C. of 5 to 4,000 cP in the form of a 2 weight % aqueous solution thereof; and
   (C) a partially saponified polyvinyl alcohol having an average polymerization degree of 1,500 to 4,000 and a saponification degree of 90 to 98 mole %, and at the time when a polymerization conversion has reached 5 to 60%, further adding, to the reaction mixture system,
   (D) a partially saponified polyvinyl alcohol having an average polymerization degree of 1500 to 4,000 and a saponification degree of 75 to 98 mole % as a second suspending agent to effect the polymerization, said process comprising still further adding a carboxylic acid ester of a polyhydric alcohol to at least one material selected from the contents inside the polymerization vessel prior to the start of the polymerization, the contents of the polymerization vessel during the polymerization, a slurry containing said polymer obtained after the polymerization was over, and a cake obtained after said slurry was dehydrated, the amounts of said components (A), (B), (C) and (D) being as defined in the following (i) to (iv):
   (i) the weight ratio of component (A)/component (B) is 9/1 to 6/4, and the total amount of components (A)

and (B) are 0.03 to 0.1 part by weight per 100 parts by weight of the monomer or monomeric mixture;

(ii) the amount of component (C) is 0.002 to 0.1 part by weight per 100 parts by weight of the monomer or monomeric mixture;

(iii) the amount of component (D) is 0.002 to 0.1 part by weight per 100 parts by weight of the monomer or monomeric mixture; and (iv) the amount of said carboxylic acid ester of polyhydric alcohol is from 0.005 to 0.5 parts by weight per 100 parts by weight of the resulting polymer, wherein the carboxylic acid ester of a polyhydric alcohol is at least one ester formed from a polyhydric alcohol selected from the group consisting of the following (a) and a carboxylic acid selected from the group consisting of the following (b), (a): Ethylene glycol, 1,2-propylene glycol, 1,4-butylene glycol, neopentyl glycol, ricinoleyl alcohol, erythritol, mannitol, sorbitol, trimethylolethane, trimethylolpropane, glycerin, 2-hydroxymethyl-3-methylbutane-1,3-diol, 3-methylpentane-1,3,5-triol, tris(2-hydroxyethyl)isocyanurate, hexane-1,2,6-triol, 2-hydroxymethyl-2-methylbutane-1,3-diol, 2,4-dimethyl-3-hydroxymethylpentane-2,4-diol, pentaerythritol, diglycerin, ditrimethylolethane, ditrimethylolpropane, 2,2,6,6-tetramethylolcyclohexanol, dipentaerythritol and inositol, (b): Caproic acid, pelargonic acid, lauric acid, 2-ethylhexanoic acid, myristic acid, palmitic acid, undecylenic acid, ricinoleic acid, linoleic acid, neodecanoic acid, isostearic acid, 12-hydroxystearic acid, 12-ketostearic acid, chlorostearic acid, phenylstearic acid, arachic acid, behenic acid, erucic acid, brassidic acid, tallow fatty acid, coconut oil fatty acid, tung oil fatty acid, soybean oil fatty acid, cotton seed oil fatty acid, benzoic acid, toluic acid, salicylic acid, p-tertbutylbenzoic acid, 5-tert-octylsalicylic acid, naphthenic acid, xylylic acid, ethylbenzoic acid, isopropylbenzoic acid, di-tert-butylbenzoic acid, bromobenzoic acid and adipic acid.

2. The process according to claim 1, wherein the polymerization conversion is 30 to 60%.

3. The process according to claim 1, wherein the carboxylic acid ester of polyhydric alcohol is at least one ester selected from the group consisting of pentaerythritol monostearate, dipentaerythritol distearate, pentaerythritol monomyristate, dipentaerythritol diadipate and pentaerythritol monoadipate.

4. The process according to claim 1, wherein the monomer-soluble polymerization initiator is at least one compound selected from the group consisting of percarbonate compounds, perester compounds, organic peroxides and azo compounds.

5. The process according to claim 1, wherein the amount of the monomer-soluble polymerization initiator is in the range of 0.03 to 5.0 parts by weight per 100 parts by weight of the monomer or monomeric mixture.

6. The process according to claim 1, wherein the polymerization temperature is in the range of 35° to 70° C.

7. The process according to claim 1, wherein the monomeric mixture is a mixture of vinyl chloride monomer with at least one copolymerizable monomer selected the group consisting of vinyl esters, acrylic and methacrylic esters, olefins, vinyl ethers, maleic anhydride, acrylonitrile, styrene and vinylidene chloride, the amount of the vinyl chloride monomer being 50% by weight or more and the remainder being the copolymerizable monomer.

8. The process according to claim 1, wherein said second suspending agent (D) is a partially saponified polyvinyl alcohol having a saponification degree of 80.2 mole % and an average polymerization degree of 2600;

the weight ratio of (A)/(B) is from 9/1 to 6/4, and the total amount of (A) and (B) is from 0.03 to 0.1 parts by weight per 100 parts by weight of the monomer or monomeric mixture; and said carboxylic acid ester of a polyhydric alcohol is the ester formed from pentaerythritol and isostearic acid, and is added to the slurry containing said polymer after said polymerization is completed.

9. A process according to claim 1, wherein said carboxylic acid ester of a polyhydric alcohol is selected from the group consisting of pentaerythritol monostearate, dipentaerythritol distearate and pentaerythritol monomyristate.

10. A process for producing a vinyl chloride polymer wherein vinyl chloride monomer or a monomeric mixture containing vinyl chloride monomer is subjected to suspension polymerization in a aqueous medium in a polymerization vessel in the presence of a monomer-soluble polymerization initiator and a suspending agent, which process comprises the steps of:

starting the polymerization of said monomer or monomeric mixture in the presence of a first suspending agent consisting of:

(A) a partially saponified polyvinyl alcohol having an average polymerization degree of 1,500 to 2,700 and a saponification degree of 75 to 85 mole %;

(B) a hydroxypropyl methyl cellulose having a methoxy-substitution degree of 26 to 30% by weight and a hydroxyproxy-substitution degree of 4 to 15% by weight and having a viscosity at 20° C. of 5 to 4,000 cP in the form of a 2 weight % aqueous solution thereof; and (C) a partially saponified polyvinyl alcohol having an average polymerization degree of 1,500 to 4,000 and a saponification degree of 90 to 98 mole %, and at the time when a polymerization conversion has reached 5 to 60%, further adding, to the reaction mixture system, (D) a partially saponified polyvinyl alcohol having an average polymerization degree of 1,500 to 4.000 and a saponification degree of 75 to 98 mole % as a second suspending agent to effect the polymerization, said process comprising still further adding a carboxylic acid ester of a polyhydric alcohol to at least one material selected from the contents inside the polymerization vessel prior to the start of the polymerization, the contents of the polymerization vessel during the polymerization, a slurry containing said polymer obtained after the polymerization was over, and a cake obtained after said slurry was dehydrated, the amounts of said components (A), (B), (C) and (D) being as defined in the following (i) to (iv):

(i) the weight ratio of component (A)/component (B) is 9/1 to 6/4, and the total amount of components (A) and (B) are 0.03 to 0.1 part by weight per 100 parts by weight of the monomer or monomeric mixture;

(ii) the amount of component (C) is 0.002 to 0.1 part by weight per 100 parts by weight of the monomer or monomeric mixture;

(iii) the amount of component (D) is 0.002 to 0.1 part by weight per 100 parts by weight of the monomer or monomeric mixture; and (iv) the amount of said carboxylic acid ester of polyhydric alcohol is from 0.005 to 0.5 parts by weight per 100 parts by weight of the resulting polymer wherein said suspending agent A is a partially saponified polyvinyl alcohol having a saponification degree of 80.2 mole % and an average polymerization degree of 2,600;

said suspending agent B is a hydroxypropyl methyl cellulose having a methoxy-substitution degree of 29.2% by weight and a hydroxypropoxy-substitution degree of 8.9% by weight and having a viscosity at 20° C. of 49.5 cP in the form of a 2 weight % aqueous solution thereof;

said suspending agent C is a partially saponified polyvinyl alcohol having a saponification degree of 97.0 mole % and an average polymerization degree of 2,100.

11. A process according to claim 10 wherein said suspending agent added during polymerization is the same material as said suspending agent A, and said carboxylic acid ester of a polyhydric alcohol is pentaerythritol monostearate.

12. A process according to claim 11 wherein said suspending agent added during polymerization is added when the polymerization conversion reaches 40%.

13. A process according to claim 12 wherein said suspending agent A is a partially saponified polyvinyl alcohol having a saponification degree of 80.2 mole % and an average polymerization degree of 2,600;

said suspending agent B is a hydroxypropyl methyl cellulose having a methoxy-substitution degree of 29.2% by weight and a hydroxypropoxy-substitution degree of 8.9% by weight and having a viscosity at 20° C. of 49.5 cP in the form of a 2 weight % aqueous solution thereof;

said suspending agent added during polymerization is a partially saponified polyvinyl alcohol having a saponification degree of 95.0 mole % and an average polymerization degree of 3,300, and said carboxylic acid ester of a polyhydric alcohol is dipentaerythritol distearate.

14. A process according to claim 1 wherein said suspending agent A is a partially saponified polyvinyl alcohol having a saponification degree of 80.2 mole % and an average polymerization degree of 2,600;

said suspending agent B is a hydroxypropyl methyl cellulose having a methoxy-substitution degree of 29.2% by weight and a hydroxypropoxy-substitution degree of 8.9% by weight and having a viscosity at 20° C. of 49.5 cP in the form of a 2 weight % aqueous solution thereof;

said suspending agent C is a partially saponified polyvinyl alcohol having a saponification degree of 97.0 mole % and an average polymerization degree of 2,100;

said suspending agent added during polymerization is a partially saponified polyvinyl alcohol having a saponification degree of 95.0 mole % and an average polymerization degree of 3,300; and said carboxylic acid ester of polyhydric alcohol is pentaerythritol monomyristate.

15. A process according to claim 1, wherein the amount of the component (D) added is in the range of 0.005 to 0.08 parts by weight per 100 parts by weight of the resulting polymer.

* * * * *